United States Patent
Pohlack et al.

(10) Patent No.: US 11,972,034 B1
(45) Date of Patent: Apr. 30, 2024

(54) HARDWARE-ASSISTED OBSCURING OF CACHE ACCESS PATTERNS

(71) Applicant: Amazon Technologies, Inc., Seattle, WA (US)

(72) Inventors: Martin Pohlack, Dresden (DE); Pawel Wieczorkiewicz, Dresden (DE); Uwe Dannowski, Moritzburg (DE)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 17/084,336

(22) Filed: Oct. 29, 2020

(51) Int. Cl.
  *G06F 21/79* (2013.01)
  *G06F 12/084* (2016.01)
  *G06F 12/0846* (2016.01)
  *G06F 12/14* (2006.01)
  *G06F 21/54* (2013.01)
  *G06F 21/60* (2013.01)

(52) U.S. Cl.
  CPC ............ *G06F 21/79* (2013.01); *G06F 12/084* (2013.01); *G06F 12/0848* (2013.01); *G06F 12/1466* (2013.01); *G06F 21/54* (2013.01); *G06F 21/602* (2013.01)

(58) Field of Classification Search
  CPC ........ G06F 21/79; G06F 21/54; G06F 21/602; G06F 12/084; G06F 12/0848; G06F 12/1466
  See application file for complete search history.

(56) References Cited

U.S. PATENT DOCUMENTS

| 5,923,847 A | 7/1999 | Hagersten |
| 6,877,063 B1 | 4/2005 | Allegrucci |

(Continued)

FOREIGN PATENT DOCUMENTS

| CA | 1283220 | 4/1991 | |
| CN | 105431862 A | * 3/2016 | ......... G06F 12/1408 |

(Continued)

OTHER PUBLICATIONS

"CEASER: Mitigating Conflict-Based Cache Attacks via Encrypted-Address and Remapping"—Moinuddin K. Qureshi, 2018 51st Annual IEEE/ACM International Symposium on Microarchitecture (MICRO), IEEE Xplore, Dec. 13, 2018 https://ieeexplore.ieee.org/document/8574585/authors#authors (Year: 2018).*

(Continued)

*Primary Examiner* — Randy A Scott
(74) *Attorney, Agent, or Firm* — Robert C. Kowert; Kowert, Hood, Munyon, Rankin & Goetzel, P.C.

(57) ABSTRACT

A computer system and associated methods are disclosed for mitigating side-channel attacks using a shared cache. The computer system includes a host having a main memory and a shared cache. The host executes a virtual machine manager (VMM) that determines respective security keys for a plurality of co-located virtual machines (VMs). A cache controller for the shared cache includes a scrambling function that scrambles addresses of memory accesses performed by threads of the VMs according to the respective security keys. Different cache tiers may implement different scrambling functions optimized for the architecture of each cache tier. Security keys may be periodically updated to further reduce predictability of shared cache to memory address mappings.

20 Claims, 8 Drawing Sheets

(56) References Cited

U.S. PATENT DOCUMENTS

| | | | |
|---|---|---|---|
| 6,961,804 B2* | 11/2005 | Denneau | G06F 12/0813 |
| | | | 711/119 |
| 7,774,645 B1 | 8/2010 | Clark | |
| 8,799,554 B1 | 8/2014 | Vincent | |
| 9,009,385 B1 | 4/2015 | Juels | |
| 10,311,229 B1 | 6/2019 | Pohlack | |
| 10,528,736 B1 | 7/2020 | Sobel | |
| 10,706,147 B1 | 7/2020 | Pohlack et al. | |
| 10,868,665 B1 | 12/2020 | Pohlack | |
| 11,791,978 B2* | 10/2023 | Qureshi | H04L 9/14 |
| | | | 713/190 |
| 2002/0069335 A1 | 6/2002 | Flylnn, Jr. | |
| 2003/0163543 A1 | 8/2003 | Deneroff | |
| 2006/0026385 A1 | 2/2006 | Dinechin | |
| 2006/0026425 A1* | 2/2006 | Douceur | H04L 9/0825 |
| | | | 713/165 |
| 2007/0028072 A1 | 2/2007 | Hennessy | |
| 2007/0180187 A1 | 8/2007 | Olson | |
| 2008/0109625 A1 | 5/2008 | Erlingsson | |
| 2011/0202728 A1 | 8/2011 | Nichols | |
| 2012/0137303 A1 | 5/2012 | Okada | |
| 2012/0317423 A1* | 12/2012 | Dolgunov | G06F 21/556 |
| | | | 713/190 |
| 2014/0059688 A1 | 2/2014 | Margalit | |
| 2014/0359778 A1 | 12/2014 | Kruglick | |
| 2015/0015913 A1 | 1/2015 | Tanba | |
| 2015/0082001 A1 | 3/2015 | Duncan | |
| 2015/0269111 A1 | 9/2015 | Bak | |
| 2015/0293720 A1 | 10/2015 | Lam | |
| 2015/0326356 A1 | 11/2015 | Guan | |
| 2015/0370724 A1 | 12/2015 | Lutas | |
| 2016/0098302 A1 | 4/2016 | Ben-Yehuda | |
| 2016/0253259 A1 | 9/2016 | Jin | |
| 2016/0350244 A1 | 12/2016 | Tsirkin | |
| 2016/0378530 A1 | 12/2016 | Ramasubramanian | |
| 2017/0004081 A1 | 1/2017 | Hayakawa | |
| 2017/0147509 A1 | 5/2017 | Nevers | |
| 2017/0285976 A1 | 10/2017 | Durham | |
| 2018/0203803 A1 | 7/2018 | Compton | |
| 2018/0341767 A1 | 11/2018 | Basak | |
| 2019/0324912 A1 | 10/2019 | Toivanen | |
| 2020/0133867 A1 | 4/2020 | Jia | |
| 2021/0216232 A1 | 7/2021 | Xie | |
| 2022/0214901 A1 | 7/2022 | Tsirkin | |

FOREIGN PATENT DOCUMENTS

| | | | |
|---|---|---|---|
| CN | 112596802 A | * | 4/2021 |
| WO | 2009057094 A1 | | 5/2009 |

OTHER PUBLICATIONS

"Scatter Cache: Thwarting Cache Attacks via Cache Set Randomization"—Werner et al., 28th USENIX Security Symposium, Aug. 16, 2019 https://www.usenix.org/conference/usenixsecurity19/presentation/werner (Year: 2019).*

Hector Marco, et al., "AMD Bulldozer Linux ASLR weakness: Reducing entropy by 87.5%", Retrieved from http://hmarco.org/bugs/AMD-Bulldozer-linux-ASLR-weakness-reducing-mmaped-files-by-eight.html on Oct. 29, 2020, pp. 1-6.

Moinuddin K. Qureshi, "CEASER: Mitigating Conflict-Based Cache Attacks via Encrypted-Address and Remapping", In 2018 51st Annual IEEE/ACM International Symposium on Microarchitecture (MICRO), IEEE, 2018, pp. 775-787.

Zhenghong Wang, et al., "New Cache Designs for Thwarting Software Cache-based Side Channel Attacks", ISCA'07, ACM, Jun. 9-13, 2007, pp. 494-505.

Maris Werner, et al., "ScatterCache: Thwarting Cache Attacks via Cache Set Randomization", 28th USENIX Security Symposium, Aug. 14-16, 2019, Santa Clara, CA, pp. 1-19.

M. Neagu, et al., "Protecting Cache Memories Through Data Scrambling Technique," 2014 IEEE 10th International Conference on Intelligent Computer Communication and Processing (ICCP), 2014, pp. 297-303.

M. Neagu, et al., "Interleaved Scrambling Technique: A Novel Low-Power Security Layer for Cache Memories," 2014 19th IEEE European Test Symposium (ETS), 2014, pp. 1-2.

M. Neagu et al., "Data Scrambling in Memories: A Security Measure," 2014 IEEE International Conference on Automation, Quality and Testing, Robotics, 2014, pp. 1-6.

Yuval Yarom et al "Flush+Reload: a High Resolution, Low Noise, L3 Cache Side-Channel Attack", pp. 1-14.

Juerg Haefliger et al., "Add support for exclusive Page Frame Ownership (XPFO)", dated Jun. 30, 2021, (Https://lwn.net/Article/699116), pp. 1-2.

Joseph Bonneau et al, "Cache-Collision Timing Attacks Against AES", pp. 1-19.

"OpenSSL Privilege Separation Analysis", dated Jun. 30, 2021, (https://access.redhat.com/blogs/766093/posts/1976283), pp. 1-4.

U.S. Appl. No. 17/185,752, filed Feb. 25, 2021, Martin Pohlack et al.

U.S. Appl. No. 17/491,252, filed Sep. 31, 2021, Martin Pohlack et al.

* cited by examiner

HARDWARE-ASSISTED OBSCURING OF CACHE ACCESS PATTERNS

BACKGROUND

Virtualization of hardware has provided numerous benefits with respect to managing large-scale computing resources for many clients with diverse needs, allowing various computing resources to be efficiently shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a service provider and be provided with varying numbers of virtual machine resources on an "as needed" basis or at least on an "as requested" basis.

In some virtualization systems, multiple guest virtual machines (VMs) are instantiated on a physical host. These VM instances may be managed using a virtual machine manager (VMM) or hypervisor executing on the host. The VMM presents each virtual machine with isolated hardware resources. By design, each guest VM is unaware of other guest VMs co-located on the same host. Nonetheless, because some hardware resources on the host are necessarily shared among the co-located VMs, information leakage may occur across the VMs. In particular, some hosts employ a shared last level cache (LLC) of the central processing unit (CPU). The LLC thus includes cached data for all guest VMs residing on the host. This shared cache may be exploited in a form of "side-channel" attack, in which an attacker VM is able observe the interactions between a victim VM and the shared cache. The manner in which the victim VM uses the cache may reveal confidential information, such as for example encryption keys employed by the victim VM.

Figure 1:
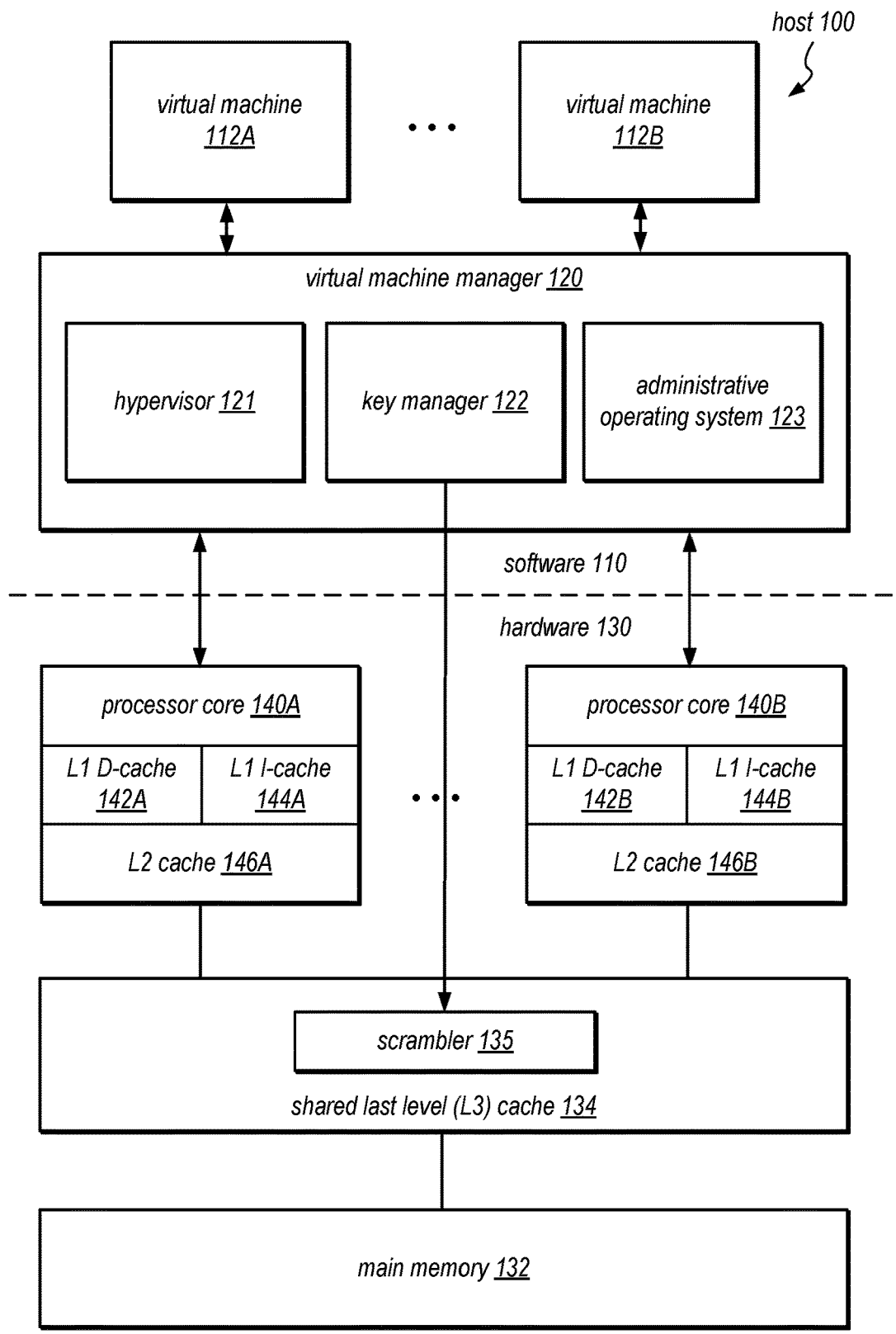
FIG. 1 is a block diagram illustrating an example computer system that implements hardware-assisted obscuring of cache access patterns to mitigate side-channel attacks that exploit a shared cache, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Modern computing systems are often optimized for throughput and overall performance, but not necessarily for perfect isolation and constant-time execution of various operations. This opens up timing side channels between multiple parties that share such systems. The systems and methods described herein may be used to mitigate side-channel attacks in virtualized computing systems and/or in local systems in which a cache is shared between multiple instances of guest virtual machines (VMs) residing on a host.

The term "side-channel" may refer to a channel of information flow in a computing system that was not intended for the use of processes or applications executing in the system, e.g., a channel of information flow that is not programmed explicitly by the operating system, but that can be opened in some systems in which shared resources are used, in some embodiments. For example, in a side-channel attack on a virtualization host, an attacker VM operating on the host may manipulate a cache that is shared between it and a victim VM co-located on the host, such that the attacker VM can observe the cache access of victim VM using the same cache. In that case, the shared cache represents a side channel over which information about the victim VM may be leaked.

A cache may be set-associative, that is, organized as S sets with W cache lines per set, in some embodiments. Thus, in an 8-way associative cache, each cache set contains 8 cache lines, which may hold up to 8 memory lines that map to the same cache set. A memory line in the cache may contain multiple addressable words of memory. When the cache is accessed, a cache set index field composed of least valued or least significant bits of the memory page address may be used to locate a cache set. The remaining highest valued or most significant bits may be used as an identifier, otherwise known as a tag or cache tag, for each cache line. After locating the cache set, the tag field of the address is matched against the tag of the W lines in the set to identify if one of the cache lines is a cache hit. As memory is much larger than the cache, more than W memory lines may map to the same cache set, potentially resulting in cache contention. If an access misses in the cache and all lines of the matching set are in use, one cache line must be evicted to free a cache slot for the new cache line. A cache's replacement policy (e.g., least-recently-used or LRU) may determine the line to evict.

One particular type of side-channel attack that exploits the cache is known as a prime and probe attack. In a prime and probe attack, an attacker VM first primes the shared cache by filling up certain cache sets in the cache with its own data. The attacker VM then waits for a victim VM to use the lines in these cache sets. After the wait period, the attacker VM probes the cache sets that were primed by accessing the lines in the cache sets. Based on the latency of these accesses, the attacker VM can infer which of its cached lines in the cache set had been replaced, possibly the victim VM. The attacker VM may re-prime the cache set during the probe phase, to prepare for the next round of accesses by the victim VM. In this manner, over time, the attacker VM may observe the memory access behavior of a victim VM, and extract information from this these observed accesses.

For example, in one particular attack, the attacker may extract a key that is used in an encryption algorithm from the observed cache access pattern. For example, the open source encryption software library GnuPG employs a square-and-multiply exponentiation algorithm as part of basic encryption and decryption operations in RSA-based encryption systems. In an RSA decryption, the decryption key is the exponent e. The square-and-multiply algorithm carries out the calculation by iterating over the binary digits of the exponent e, performing different operations at each step of the iteration, depending on whether a particular digit of exponent is a 0 or a 1. It has been documented that on some systems, the square-and-multiply algorithm produces a memory access pattern that essentially reveals the digits of the exponent e. A number of other techniques are known to extract other types of information from a program's memory usage patterns.

Attacks can also aim at data. For example, monitoring of portions of a lookup table used in a software implementation of a symmetric encryption function, which again, allows to gather information about the cryptographic key currently being used.

In order to efficiently carry out such attacks, the attacker VM may have to consistently write to particular areas of the cache. This is because the shared cache is often a high-level cache that is very large in size, and thus it may be impossible to monitor every cache set in the shared cache using prime and probe. The attacker VM may have to identify a particular cache set to monitor and then construct an eviction set that is consistently mapped to that cache set. This eviction set is then used to repeatedly prime and probe the targeted cache set in the shared cache.

Virtual machines may also exploit this lack of isolation to establish covert communication channels that otherwise are not allowed to exist. The possibility to deterministically sense changes of cache state (via timing side-channel) enables two cooperating parties to establish a reliable communication protocol with sufficient bandwidth to either extract information or even establish an interactive control session. Again, the isolation promise is broken and deep content inspection may have to be performed to gain confidence into the isolation property.

Existing mitigation strategies for these attacks, for example constant time operations, using hardware implementations for symmetric cryptography, all require changes in the victim programs because ultimately the system does not offer perfect isolation between parties. Some computing systems may provide processor extensions to allow main memory to be encrypted during execution but, while this may improve isolation, the locations of the data and code remain unchanged. Content is not moved to different positions in memory while being encrypted and this leaves the above attack vectors open. Cache line usage can still be monitored in virtualized environments with multiple guests, for example in cloud computing services.

Various techniques to mitigate attacks that exploit a shared cache using hardware-assisted obscuring of cache access patterns are described herein. These systems and methods make placement of cache lines unpredictable between software executing in different virtual machines.

FIG. 1 is a block diagram illustrating an example computer system that implements hardware-assisted obscuring of cache access patterns to mitigate side-channel attacks that exploit a shared cache, according to some embodiments. The system may include a host 100, which includes software 110 that executes on hardware 130.

The hardware 130 may include one or more multi-core processors that each comprise multiple processor cores 140A, 140B, etc. These processor cores may act as separate instruction processing units. The cores may process instructions concurrently, thus increasing the overall speed of the combined processing unit. In some embodiments, processor cores 140A and 140B may reside on a single integrated circuit or chip.

The hardware 130 may also include a main memory 132 addressable by the processor cores which may be the main runtime memory of the host. The main memory 132 may be a form of volatile memory such as dynamic random-access memory (DRAM) or static random-access memory (SRAM). In some embodiments, the main memory 132 may be located in one or more chips or devices different from the processor cores. The host 100 may execute an operating system that manages the main memory 132 for programs executing on the host 100. When a program needs memory, it may request memory from the operating system, in units called frames or pages.

The hardware 130 may include a shared last level cache (LLC) 134. The LLC 134 may act as a cache on the main memory 132, which is smaller than the main memory 132, but faster to access. In some embodiments, the LLC 134 is located on the processor chip. As depicted, the LLC 134 is a level 3 (L3) cache, which may represent the highest level or tier of the cache hierarchy. As shown, the LLC 134 is shared by all processor cores 140A, 140B, etc. This sharing may be implemented using a fast communication interface on the processor chip(s). However, accessing the LLC 134 is still slower than accessing lower levels of the cache hierarchy that may be local to the individual processor cores 140. In some embodiments, the LLC 134 is an inclusive cache, meaning that it contains all cache entries of lower levels of cache in the cache hierarchy, including the L1 D-cache 142, the L1 I-cache 144, and the L2 cache 146.

As depicted, each processor core 140 may also have its own local cache, which may include an L1 data cache (D-cache) 142, an L1 instruction cache (I-cache) 144, and an L2 cache 146. The L1 D-cache 142 may be a data cache to speed up data fetch and store, and the L1 I-cache 144 may be an instruction cache to speed up executable instruction fetch. The L2 cache 144 may not be split and into an instruction cache and a data cache. The L2 cache 146 may be larger than the L1 cache, but slower to access than the L1 cache.

Also shown in the LLC 134 is a scrambler 135 which controls mappings between addresses of memory accesses and cache sets. To implement this control of mappings, the scrambler 135 receives parameters in the form of Enclave Cache Scrambling Keys (ECSKs) from a key manager 122 of a virtual machine manager (VMM) 120 as discussed further below. While the scrambler 135 is shown as part of the LLC 134, in some embodiments different scrambler components may also be using in other levels, or tiers, of the cache, including the L1 caches 142 and 144 and the L2 caches 146, and these scrambler components may differ in function between the various cache levels so as to optimize the function of the scrambler for the particular architecture of each cache level. Furthermore, a system may employ more or fewer levels of cache that is shown in FIG. 1, with different scramblers implementing in some or all the different cache levels, and those of ordinary skill in the art will recognize that the cache organization shown in FIG. 1 is merely an example and is not intended to be limiting.

In operation, data is transferred between the main memory 132 and cache hierarchy in blocks of fixed size, called cache lines or cache blocks. When a cache line is copied from the main memory 132 into the cache, a cache entry is created. The cache entry will include the copied data as well as an indicator of requested main memory location, called a tag. When the processor 140 needs to read or write a location in main memory, the system first checks for a corresponding entry in a first level of cache. If the requested memory location is in the first level, a cache hit has occurred, and the processor simply reads or writes the data in the cache line. However, if the processor does not find the memory location in the first level, the processor 140 proceeds to the next level of the cache hierarchy, and so on, until an entry is found. If the memory location is not found at any level in the cache hierarchy, a cache miss has occurred. In this case, a new cache entry is allocated and data from the main memory 132 is copied into the cache hierarchy, after which the request may be fulfilled from the contents of the cache. Because the slower main memory 132 is accessed during a cache miss, the processor 140 will experience a significant added latency for a memory access that generates a cache miss. The precise details of cache management will be different based on the hardware platform.

The software 110 of the host 100 may comprise a virtual machine manager 120 that supports one or more virtual machines instances 112A, 112B, etc. The virtual machine manager (VMM) 120 may include one or more modules capable of instantiating and managing the different VMs 112. The VMM 120 may include, for example, a hypervisor 121 and an administrative instance of an operating system 123, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider.

The VMM 120 may also include a key manager 122 which may generate ECSKs for use in the scrambler(s) 135. In some embodiments, ECSKs may be derived from or directly coupled to enclave encryption keys in systems that provide support for encrypted memory. In this way, hardware-assisted obscuring of cache access patterns may be implemented in combination with hardware encryption of memory. In some embodiments, ECSKs may be derived in consideration of the scrambling functions implemented by the scrambler(s) 135 such that cache partitioning may be employed, as discussed below in FIG. 6. ECSKs may further be periodically changed to further obscure cache access patterns, as discussed below in FIG. 7. In embodiments implementing different scramblers 135 for different cache levels, ECSKs may be updated at different periodic rates optimized to the particular architecture and function of each cache level.

A VM 112 may comprise one or more compute instances with a specified computational capacity (which may be specified by indicating the type and number of processor cores, the main memory size, and so on) and a specified software stack (e.g., a particular version of an operating system, which may in turn run on top of a hypervisor). One or more different computing devices may be used singly or in combination to implement the VM instances on the virtualization host. The computing devices may include general purpose or special purpose computers, storage devices, network devices and the like. The instances may operate or implement a variety of different platforms, such as application server instances, JAVA™ virtual machines (JVMs), general purpose or special-purpose operating systems, platforms that support various interpreted or compiled programming languages such as RUBY, PERL, PYTHON, C, C++ and the like, or high-performance computing platforms) suitable for performing client applications. Different instances may have different numbers of virtual processor cores, and different amounts of memory, cache, storage and/or networking capacity, as well as any other performance characteristic. Configurations of instances may include their location, in a particular data center, availability zone, geographic, location, etc., and (in the case of reserved compute instances) reservation term length.

The VMs 112 may be instantiated to provide a variety of services that allows clients to use computing resources in a service provider network. These VMs 112 can, for example, provide access to generic compute instances. The service provider network can also provide access to specialized compute instances with specialized functionality, such as routers, domain name systems (DNSs), load balancers, desktop virtualization servers, and the like. The service provider network may include various types of storage services that expose different types of storage access interfaces, including block-based storage services, relational database services, NoSQL database services, file system services, and the like. The service provider network may also include services that provide functionalities of commonly used software modules, which can be used in conjunction with other software to implement larger systems. For example, provided services may include queuing services, notification services, logging services, key storage and management services, and the like. The provided services may include services that implement larger systems with sophisticated functionality, such as machine learning, identity management, software development environments, multi-tenant containers for hosting software tenants, and the like. The services may be standard services provided by the service provider, or services implemented by third parties on top of the standard services. The services may operate on computing resources of the service provider network, and may be controlled and configured by clients via various interfaces such as graphical user interface (GUI) (e.g., as part of an administration control panel or web site) and/or as a programmatic interface such as an Application Programming Interface (API). As the services operate on the service provider's computing resources, usage or performance metrics data may be generated and captured.

Figure 2:
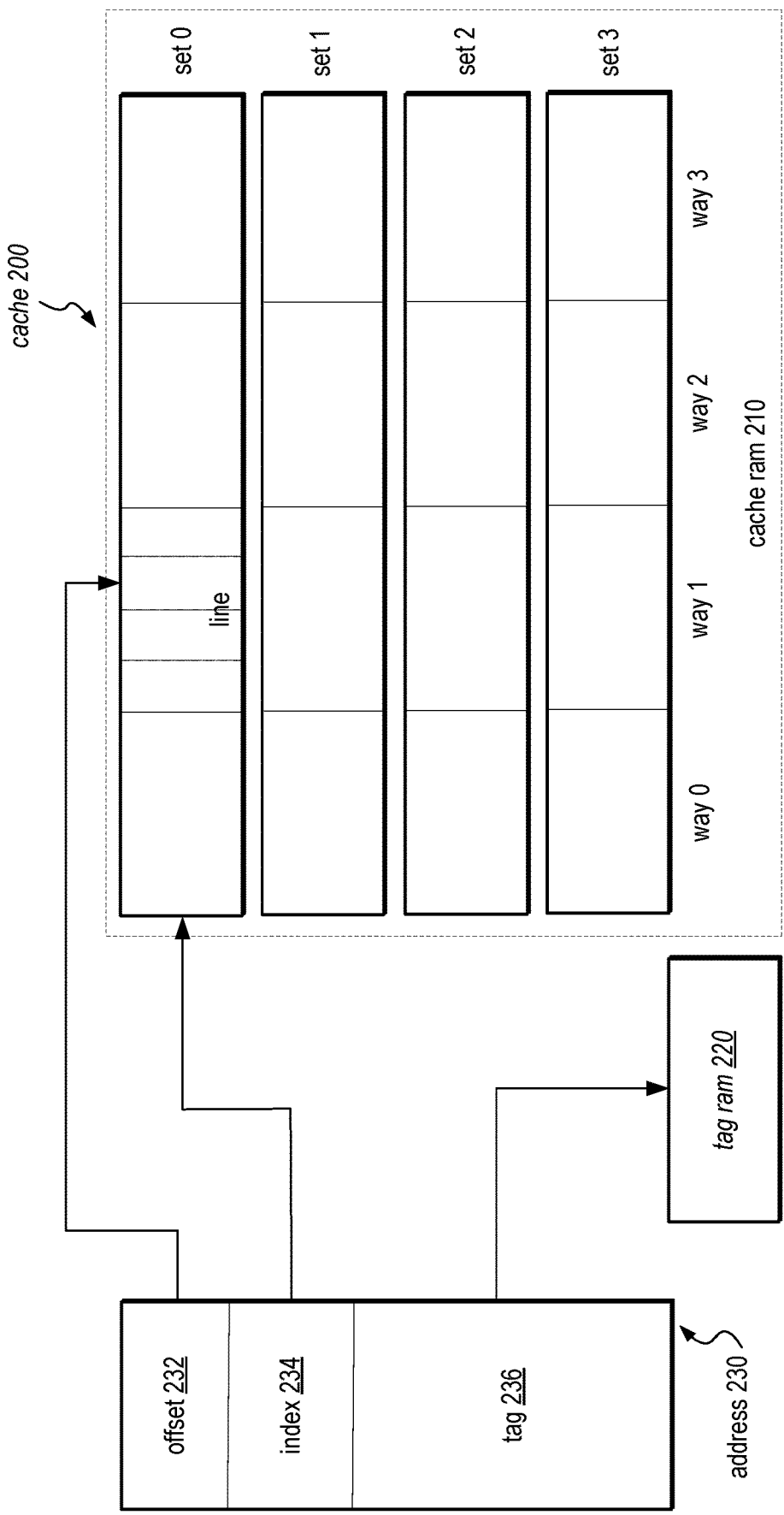
FIG. 2 illustrates the operations of a conventional cache for a computer memory system, according to some embodiments.

FIG. 2 illustrates the operations of a conventional cache for a computer memory system, according to various embodiments. A cache 200 may include a cache ram 210 and a tag ram 220. Data stored in the cache may be stored in the cache ram 210 while data information identifying specific data stored in the cache, otherwise known as tags or cache tags, may be stored in the tag ram 220. The tag ram 220 may include a plurality of entries, not shown, where each entry in the cache has a corresponding element in the cache ram 210 and an identifying entry in the tag ram 220.

The cache may be organized as a collection of cache blocks or lines. Each cache line may include one or more processor-addressable words of memory identifiable using a memory address 230. Individual cache lines are organized into sets of cache lines, shown as sets 0-3 in FIG. 2, where a particular memory word may be stored in only one set of cache lines but may be stored in any one of the cache lines within that set. The number of cache lines within a set defines the set-associativity of the cache, shown as ways 0-3 in FIG. 2, where the set-associativity is the number of locations with the cache that an individual memory element can be stored. The total size of the cache, in machine-addressable words, is equal to the number of sets in the cache times the set-associativity.

FIG. 2 shows an example cache organized as a 4-way set-associative cache using cache lines of 4 machine words. Such an example is chosen for clarity of explanation and is not intended to be limiting. Set associative caches may include cache lines of a wide range of sizes in various embodiments from a single machine word to many tens or even hundreds of machine words, although for performance reasons cache line sizes may frequently be powers of two. Likewise, in various embodiments set-associativity may vary from a single line, otherwise known as a direct mapped cache, to a large number of lines. Furthermore, cache subsystems frequently include multiple cache levels, such as cache levels 134, 142, 144 and 146 of FIG. 1, where different levels of the cache subsystem have different configurations of cache line and set associativity sizes to meet differing performance requirements.

To perform a memory access, the cache 200 may receive a memory address 230. In some embodiments, this address may represent a physical address of memory while in other embodiments in may be a virtual address. The cache may divide the address into three contiguous portions of address bits. The first portion includes a contiguous portion of least significant bits that are used to select a particular memory word within the cache line. In the example configuration of FIG. 2, this first portion, the offset 232, would include the 2 least significant bits, containing the values 0-3, corresponding to the 4 machine words of a cache line.

A second portion of the memory address, the index 234, will contain the next least significant bits of the memory address to identify the cache set. In the example configuration of FIG. 2, this second portion would also include 2 bits, containing the values 0-3, corresponding to the 4 cache sets.

The combined portion including the first portion and second portion of the memory address would therefore include the 4 least significant bits. The remaining most significant bits of the memory address would be included in the third portion, the tag 236. The tag 236 may be used to identify the particular memory address in the cache using the tag ram 220.

For an access of the memory address, the cache identifies a particular set, using the index 234, in the cache where the contents of the memory may be found, then searches each of the ways 0-3 of the identified cache set to see if the tag 236 is stored in the respective entries of the tag ram 220. If an entry in the tag ram 220 contains the tag 236, then the contents of the memory address is stored in the cache ram 210 in the line associated with the tag ram entry. The cache may then satisfy the memory access using the particular cache line and the offset 232.

Figure 3:
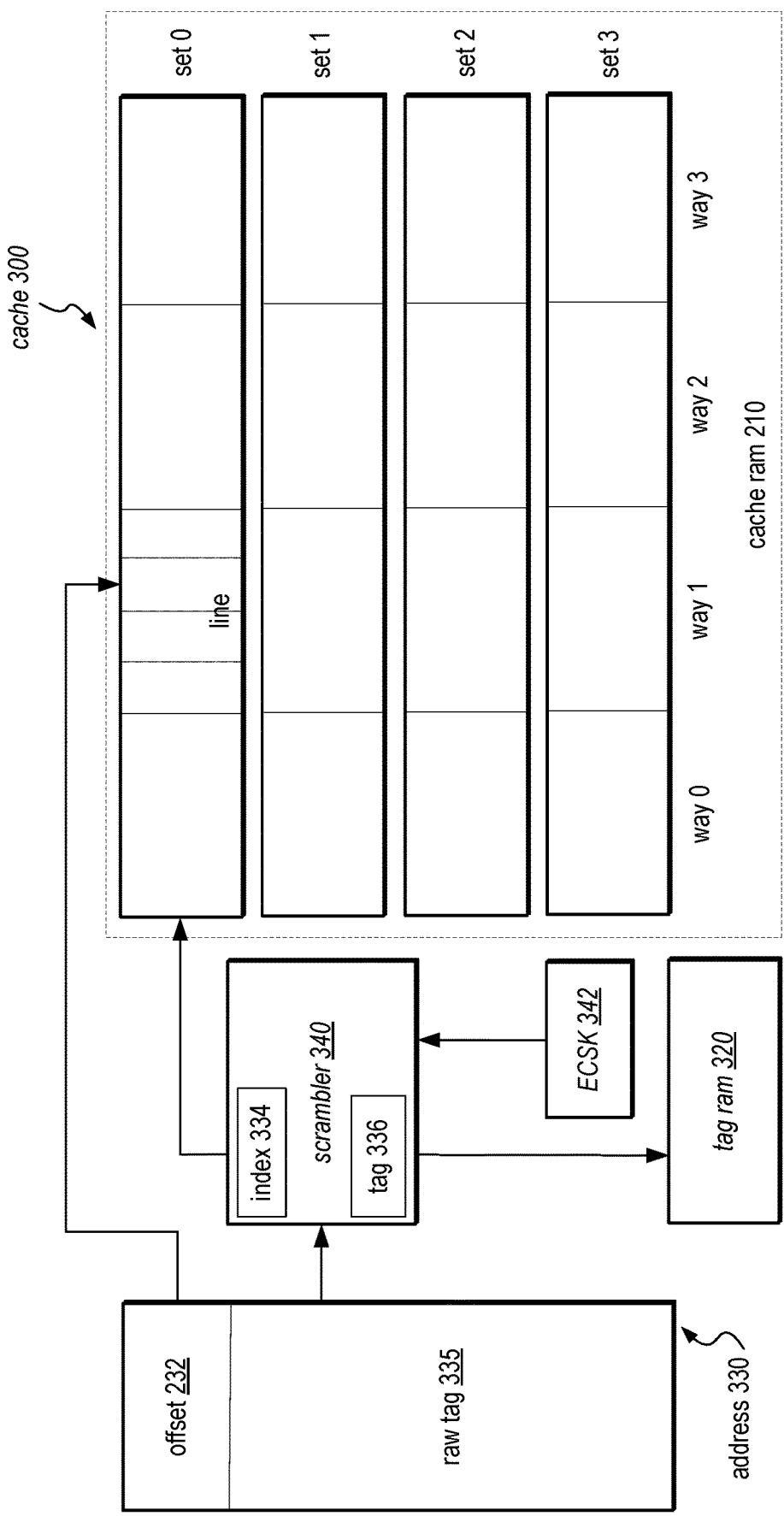
FIG. 3 illustrates the operations of a cache for a computer memory system that includes a scrambling function to mitigate side-channel attacks that exploit a shared cache, according to some embodiments.

FIG. 3 illustrates the operations of a cache for a computer memory system that includes a scrambling function to mitigate side-channel attacks that exploit a shared cache, according to some embodiments. A cache 300 may include a cache ram 210 and a tag ram 320. Data stored in the cache may be stored in the cache ram 210 while data information identifying specific data stored in the cache, otherwise known as tags or cache tags, may be stored in the tag ram 320. The tag ram 320 may include a plurality of entries, not shown, where each entry in the cache has a corresponding element in the cache ram 210 and an identifying entry in the tag ram 320.

The cache may be organized as a collection of cache blocks or lines. Each cache line may include one or more processor-addressable words of memory identifiable using a memory address 330. Individual cache lines are organized into sets of cache lines, shown as sets 0-3 in FIG. 3, where a particular memory word may be stored in only one set of cache lines but may be stored in any one of the cache lines within that set. The number of cache lines within a set defines the set-associativity of the cache, shown as ways 0-3 in FIG. 3, where the set-associativity is the number of locations with the cache that an individual memory element can be stored. The total size of the cache, in machine-addressable words, is equal to the number of sets in the cache times the set-associativity.

FIG. 3 shows an example cache organized as a 4-way set-associative cache using cache lines of 4 machine words. Such an example is chosen for clarity of explanation and is not intended to be limiting. Set associative caches may include cache lines of a wide range of sizes in various embodiments from a single machine word to many tens or even hundreds of machine words, although for performance reasons cache line sizes may frequently be powers of two. Likewise, in various embodiments set-associativity may vary from a single line, otherwise known as a direct mapped cache, to a large number of lines. Furthermore, cache subsystems frequently include multiple cache levels, such as cache levels 134, 142, 144 and 146 of FIG. 1, where different levels of the cache subsystem have different configurations of cache line and set associativity sizes to meet differing performance requirements.

To perform a memory access, the cache 300 may receive a memory address 330. In some embodiments, this address may represent a physical address of memory while in other embodiments in may be a virtual address. The cache may divide the address into two contiguous portions of address bits. The first portion includes a contiguous portion of least significant bits that are used to select a particular memory word within the cache line. In the example configuration of FIG. 3, this first portion, the offset 232, would include the 2 least significant bits, containing the values 0-3, corresponding to the 4 machine words of a cache line.

The remaining most significant bits of the memory address would be included in the second portion, the raw tag 335, in some embodiments. As compared to the conventional cache of FIG. 2, the raw tag 335 may include both the corresponding index 234 and tag 236 portions of the memory address.

The raw tag 335 may then be input into the scrambler 340 along with an EC SK 342 for the security group of the executing code requesting the memory access, in some embodiments. The scrambler modifies the raw tag 335 according to a parameterized scrambling function and the ECSK 342 to generate an index 334 and a tag 336. The index 334 may be used to identify the cache set and the tag 336 may be used to identify the particular memory address in the cache using the tag ram 320, in some embodiments.

The scrambler 340 may implement a variety of scrambling functions in various embodiments. In some embodiments, the scrambler may implement a simple scrambling function involving the reordering and/or logical inverting of a limited number of the bits of the raw tag 335. Such a scrambling function may be useful in cache levels where high performance and low latency are of particular importance, such as in the L1 caches 142 and 144 of FIG. 1. In other embodiments, more complex scrambling functions may be used, such as those involving a greater number of bits of the raw tag 335 and/or implementing operations of greater complexity such as cryptographic operations or hash functions. Such more complex scrambling functions may trade off increased latency with greater immunity to exploitation and may be suitable for larger, slower caches further from the processor in a multi-level cache hierarchy, such as the LLC cache 134 of FIG. 1. These example scrambling functions are not intended to be limiting, however, and any number of scrambling functions may be envisioned.

As compared to the conventional cache of FIG. 2, the index 334 and the corresponding index 224 may have the same number of bits corresponding to the same number of cache sets in the cache, with 2 bits corresponding to 4 cache sets in the respective example cache configurations. In some embodiments, however, the tag 336 and the corresponding tag 236 may have a different number of bits depending on the scrambling function used and the particular bits scrambled in the memory address. Likewise, in some embodiments the tag ram 320 of FIG. 3 may be different from the tag ram 220 of FIG. 2 due a different number of bits contained with the respective tags.

For an access of the memory address, the cache identifies a particular set, using the index 334, in the cache where the contents of the memory may be found, then searches each of the ways 0-3 of the identified cache set to see if the tag 336 is stored in the respective entries of the tag ram 320. If an entry in the tag ram 320 contains the tag 336, then the contents of the memory address is stored in the cache ram 210 in the line associated with the tag ram entry. The cache may then satisfy the memory access using the particular cache line and the offset 232.

Figure 4:
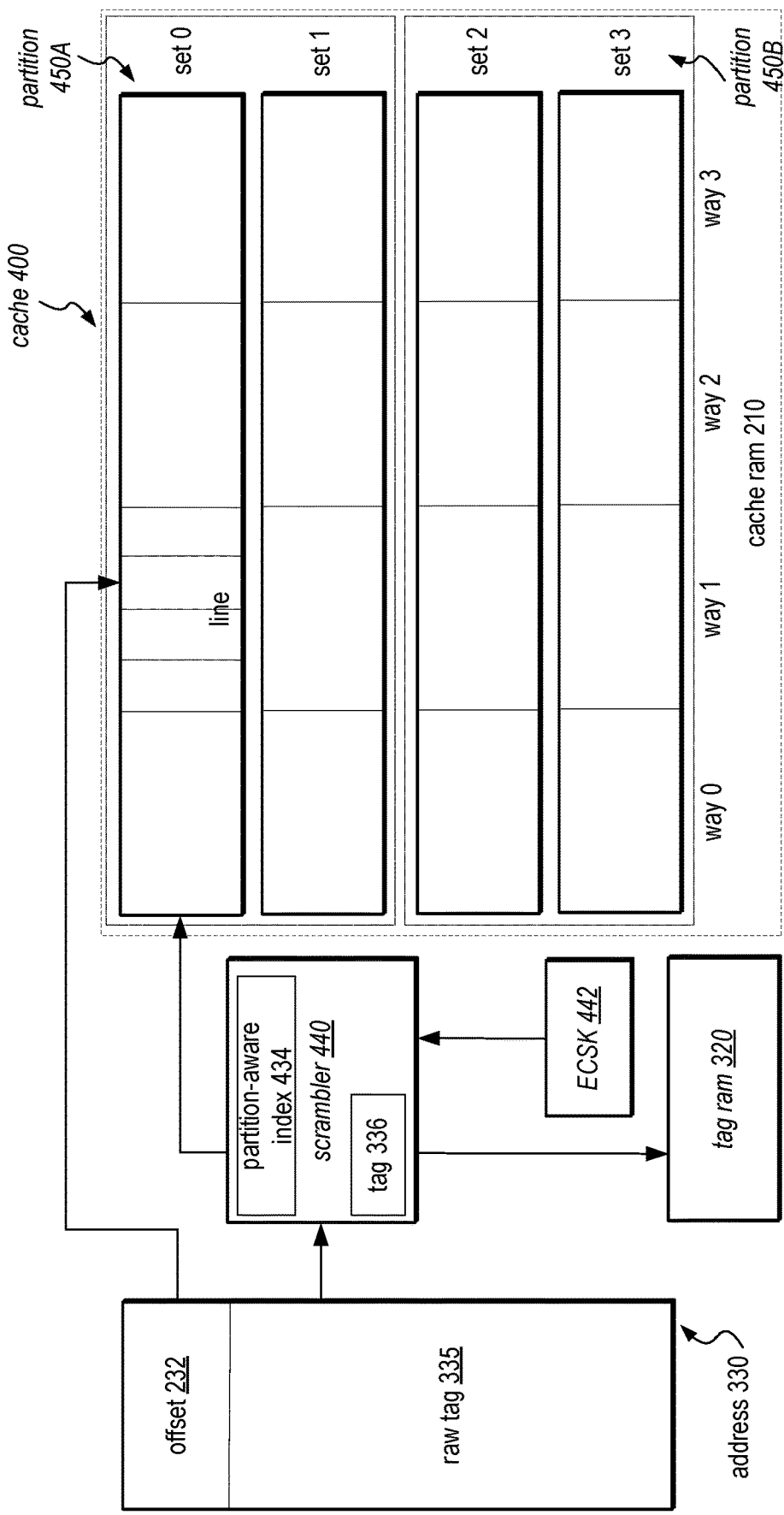
FIG. 4 illustrates the operations of a cache for a computer memory system that includes a scrambling function and cache partition reservations to mitigate side-channel attacks that exploit a shared cache, according to some embodiments.

FIG. 4 illustrates the operations of a cache for a computer memory system that includes a scrambling function and cache partition reservations to mitigate side-channel attacks that exploit a shared cache, according to some embodiments. A cache 400 may include a cache ram 210 and a tag ram 320. Data stored in the cache may be stored in the cache ram 210 while data information identifying specific data stored in the cache, otherwise known as tags or cache tags, may be stored in the tag ram 320. The tag ram 320 may include a plurality of entries, not shown, where each entry in the cache has a corresponding element in the cache ram 210 and an identifying entry in the tag ram 320.

The cache may be organized as a collection of cache blocks or lines. Each cache line may include one or more processor-addressable words of memory identifiable using a memory address 330. Individual cache lines are organized into sets of cache lines, shown as sets 0-3 in FIG. 4, where a particular memory word may be stored in only one set of cache lines but may be stored in any one of the cache lines within that set. The number of cache lines within a set defines the set-associativity of the cache, shown as ways 0-3 in FIG. 4, where the set-associativity is the number of locations with the cache that an individual memory element can be stored. The total size of the cache, in machine-addressable words, is equal to the number of sets in the cache times the set-associativity.

FIG. 4 shows an example cache organized as a 4-way set-associative cache using cache lines of 4 machine words. The cache may be further organized to divide the 4 cache sets into two partitions of 2 cache sets each, shown as partition 450A and 450B. Such an example is chosen for clarity of explanation and is not intended to be limiting. Set associative caches may include cache lines of a wide range of sizes in various embodiments from a single machine word to many tens or even hundreds of machine words, although for performance reasons cache line sizes may frequently be powers of two. Likewise, in various embodiments set-associativity may vary from a single line, otherwise known as a direct mapped cache, to a large number of lines. Furthermore, cache subsystems frequently include multiple cache levels, such as cache levels 134, 142, 144 and 146 of FIG. 1, where different levels of the cache subsystem have different configurations of cache line and set associativity sizes to meet differing performance requirements.

While the example configuration includes 2 partitions of 2 cache sets each, this example is not intended to be limiting and any configuration of partitions may be employed in various embodiments. Individual partitions may include any number of cache sets up to an including the total number of cache sets in the cache, and in some embodiments partitions may overlap such that some cache sets may be included in more than one partitions. In other embodiments, partitions may be non-overlapping such that individual cache sets may be included in only one partition.

To perform a memory access, the cache 300 may receive a memory address 330. In some embodiments, this address may represent a physical address of memory while in other embodiments in may be a virtual address. The cache may divide the address into two contiguous portions of address bits. The first portion includes a contiguous portion of least significant bits that are used to select a particular memory word within the cache line. In the example configuration of FIG. 4, this first portion, the offset 232, would include the 2 least significant bits, containing the values 0-3, corresponding to the 4 machine words of a cache line.

The remaining most significant bits of the memory address would be included in the second portion, the raw tag 335, in some embodiments. As compared to the conventional cache of FIG. 2, the raw tag 335 may include both the corresponding index 234 and tag 236 portions of the memory address.

The raw tag 335 may then be input into the scrambler 440 along with an EC SK 442 for the security group of the executing code requesting the memory access, in some embodiments. The ECSK 442 may, in some embodiments, be selected such that the scrambling function of the scrambler 440 may only select sets from the partition 450A. The scrambler modifies the raw tag 335 according to a parameterized scrambling function and the ECSK 442 to generate a partition-aware index 434 and a tag 336. The partition-aware index 434 may be used to identify the cache set and the tag 336 may be used to identify the particular memory address in the cache using the tag ram 320, in some embodiments.

The scrambler 340 may implement a variety of scrambling functions in various embodiments. In some embodiments, the scrambler may implement a simple scrambling function involving the reordering and/or logical inverting of a limited number of the bits of the raw tag 335. Such a scrambling function may be useful in cache levels where high performance and low latency are of particular importance, such as in the L1 caches 142 and 144 of FIG. 1. In other embodiments, more complex scrambling functions may be used, such as those involving a greater number of bits of the raw tag 335 and/or implementing operations of greater complexity such as cryptographic operations or hash functions. Such more complex scrambling functions may trade off increased latency with greater immunity to exploitation and may be suitable for larger, slower caches further from the processor in a multi-level cache hierarchy, such as the LLC cache 134 of FIG. 1. These example scrambling functions are not intended to be limiting, however, and any number of scrambling functions may be envisioned.

As compared to the conventional cache of FIG. 2, the partition-aware index 434 and the corresponding index 224 may have the same number of bits corresponding to the same number of cache sets in the cache, with 2 bits corresponding to 4 cache sets in the respective example cache configurations. In some embodiments, however, the tag 336 and the corresponding tag 236 may have a different number of bits depending on the scrambling function used and the particular bits scrambled in the memory address. Likewise, in some embodiments the tag ram 320 of FIG. 4 may be different from the tag ram 220 of FIG. 2 due a different number of bits contained with the respective tags.

For an access of the memory address, the cache identifies a particular set, using the partition-aware index 434, in the reserved partition of the cache where the contents of the memory may be found, then searches each of the ways 0-3 of the identified cache set to see if the tag 336 is stored in the respective entries of the tag ram 320. If an entry in the tag ram 320 contains the tag 336, then the contents of the memory address is stored in the cache ram 210 in the line associated with the tag ram entry. The cache may then satisfy the memory access using the particular cache line and the offset 232.

Figure 5:
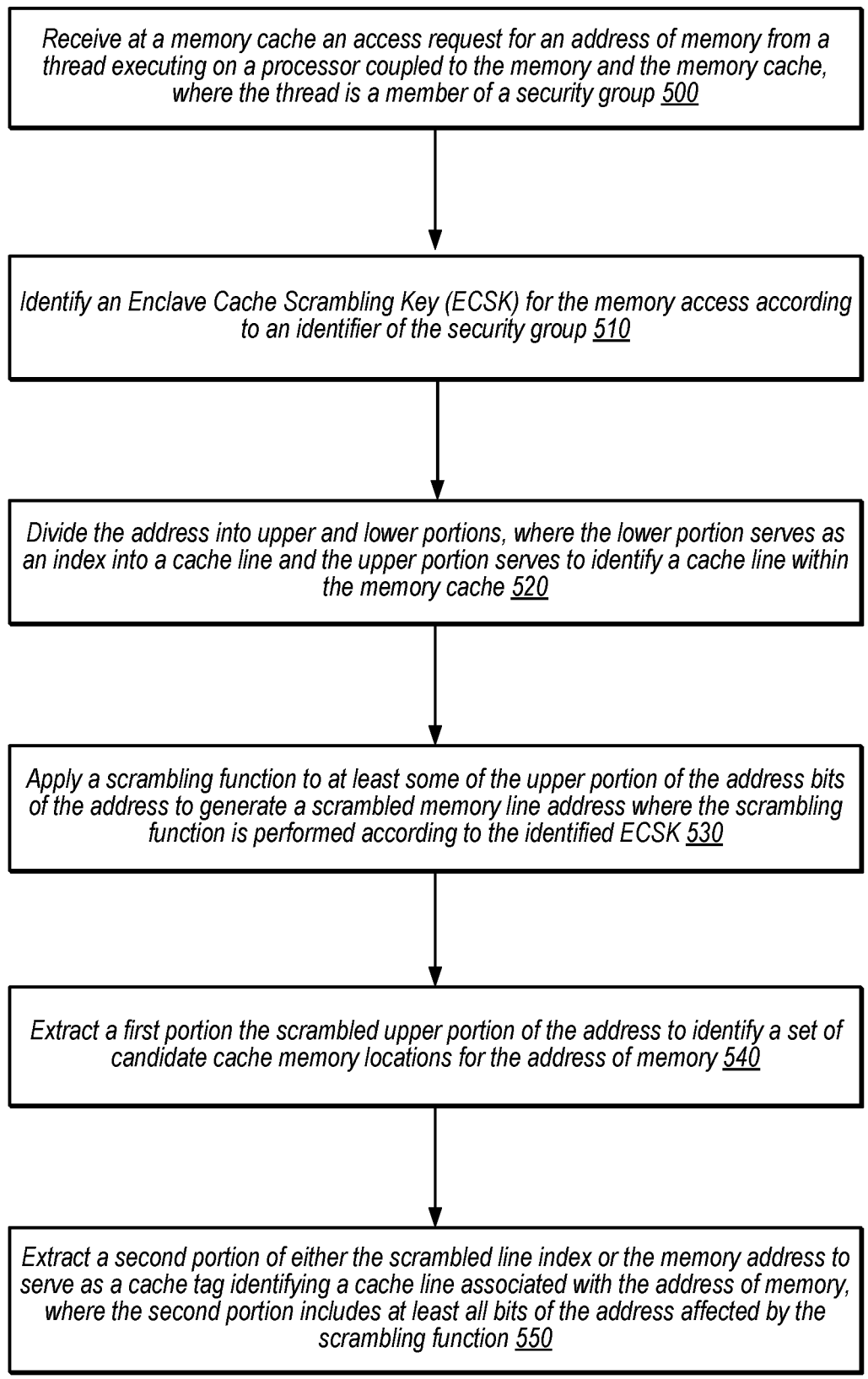
FIG. 5 is a flowchart diagram illustrating a process for identifying a set of candidate cache lines for a memory access including hardware-assisted obscuring of cache access patterns, according to some embodiments.

FIG. 5 is a flowchart diagram illustrating a process for identifying a set of candidate cache lines for a memory access including hardware-assisted obscuring of cache access patterns, according to some embodiments. The process begins at step 500 where a memory access request is received at a cache, such as the cache 300 of FIG. 3. The memory access may be performed by a thread executing on a processor that is a member of a particular security group, or enclave. As shown in 510, the cache may then identify an Enclave Cache Security Key (ECSK) for the requested memory access according to an identifier of the particular security group associated with the thread, in some embodiments.

As shown in 520, the cache may then divide the address of the memory access into upper and lower portions, where the lower portion, such as the offset 232 as shown in FIG. 3, may be used as an index into a cache line to access the memory location within the cache while the upper portion, such as the tag 335 of FIG. 3, may be used to locate a cache line containing the contents of the memory location. This division of bits may differ in various embodiments due to the specific configuration of the cache memory.

The cache may then, as shown in 530, apply a scrambling function using a scrambler, such as the scrambler 340 of FIG. 3, to some or all of the upper portion of the address bits of the memory location being addressed. The scrambling function may be applied according to the identified ECSK to generate a scrambled portion of the memory address specific to the security group of the requesting thread. In some embodiments, relatively few of the bits of the upper portion may be scrambled while in other embodiments more of the bits of the upper portion may be scrambled depending on the security and performance requirements of the cache.

As shown in 540, the cache may then extract a first portion of the scrambled portion of the memory address, such as the index 334 of FIG. 3, to identify a set of candidate cache locations that may contain the requested memory contents. The cache may then further extract, as shown in 550, a second portion of the scrambled portion of the memory address, such as the index 336 of FIG. 3, to serve as a cache tag identifying the memory address within the cache. In some embodiments, the first portion and second portion may not include any common bits of the scrambled portion of the memory address whereas in other embodiments the first portion and second portion may share some common bits of the scrambled portion of the memory address.

Figure 6:
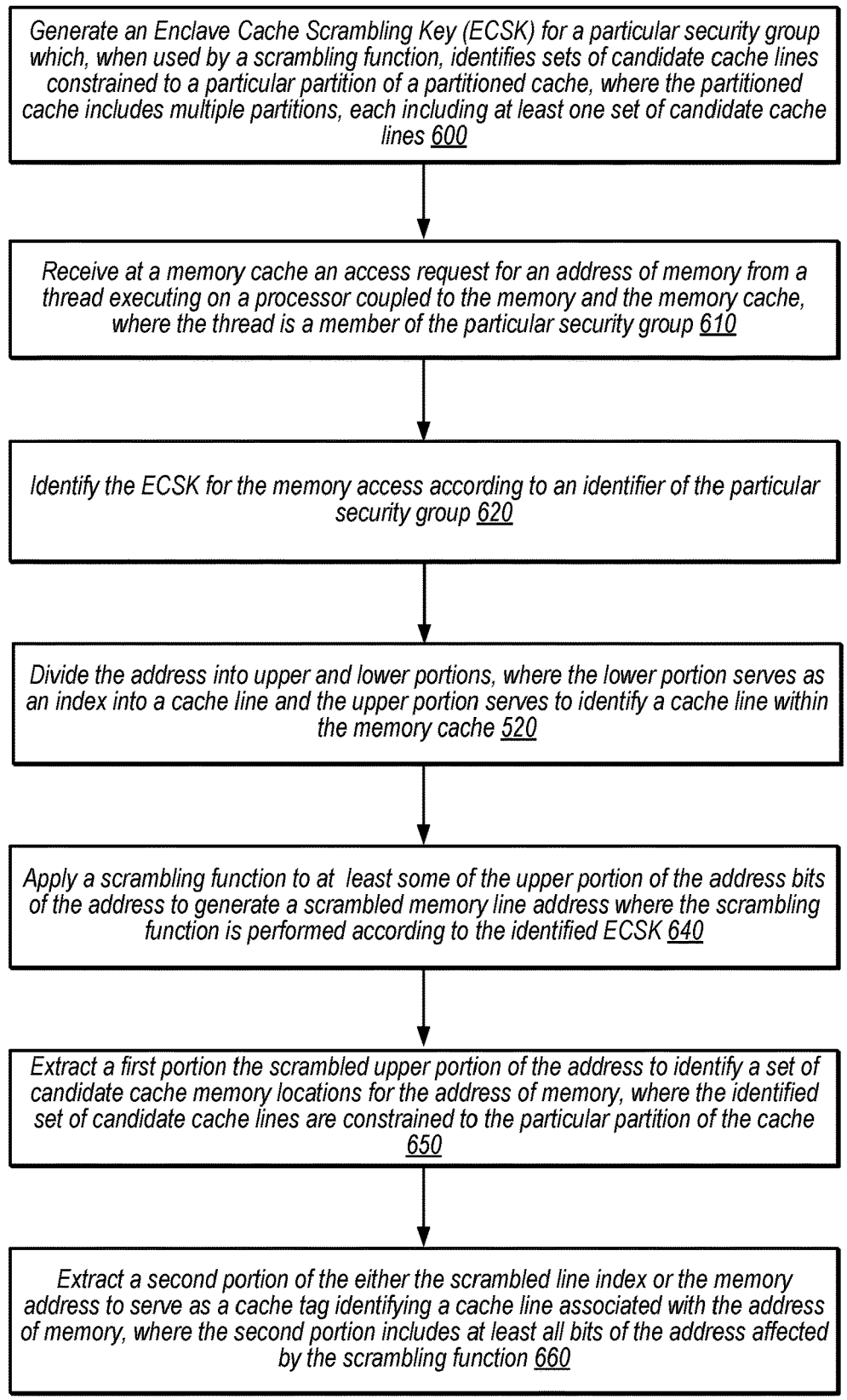
FIG. 6 is another flowchart diagram illustrating a process for identifying a set of candidate cache lines for a memory access including hardware-assisted obscuring of cache access patterns with cache partitioning, according to some embodiments.

FIG. 6 is flowchart diagram illustrating a process for identifying a set of candidate cache lines for a memory access including hardware-assisted obscuring of cache access patterns with cache partitioning, according to some embodiments. The process begins at step 600 where an Enclave Cache Security Key (ECSK) is generated for a particular security group, or enclave, for which a particular partition of the cache is reserved. In some embodiments, the EC SK may be generated such that, when used by a scrambler of a cache, such as the scrambler 440 of FIG. 4, candidate sets of cache lines will be selected from the particular partition reserved.

The process proceeds to 620 where a memory access request is received at a cache, such as the cache 400 of FIG. 4. The memory access may be performed by a thread executing on a processor that is a member of a particular security group, or enclave, for which a particular partition of the cache is reserved. As shown in 620, the cache may then identify the particular ECSK for the requested memory access according to an identifier of the particular security group associated with the thread, in some embodiments.

As shown in 630, the cache may then divide the address of the memory access into upper and lower portions, where the lower portion, such as the offset 232 as shown in FIG. 4, may be used as an index into a cache line to access the memory location within the cache while the upper portion, such as the tag 335 of FIG. 4, may be used to locate a cache line containing the contents of the memory location. This division of bits may differ in various embodiments due to the specific configuration of the cache memory.

The cache may then, as shown in 640, apply a scrambling function using a scrambler, such as the scrambler 440 of FIG. 4, to some or all of the upper portion of the address bits of the memory location being addressed. The scrambling function may be applied according to the particular ECSK to generate a scrambled portion of the memory address specific to the security group of the requesting thread. In some embodiments, relatively few of the bits of the upper portion may be scrambled while in other embodiments more of the bits of the upper portion may be scrambled depending on the security and performance requirements of the cache.

As shown in 650, the cache may then extract a first portion of the scrambled portion of the memory address, such as the partition-aware index 434 of FIG. 4, to identify a set of candidate cache locations that may contain the requested memory contents. In some embodiments, the identified set of candidate cache locations may be constrained to the partition of the cache reserved for the particular security group.

The cache may then further extract, as shown in 660, a second portion of the scrambled portion of the memory address, such as the index 336 of FIG. 4, to serve as a cache tag identifying the memory address within the cache. In some embodiments, the first portion and second portion may not include any common bits of the scrambled portion of the memory address whereas in other embodiments the first portion and second portion may share some common bits of the scrambled portion of the memory address.

Figure 7:
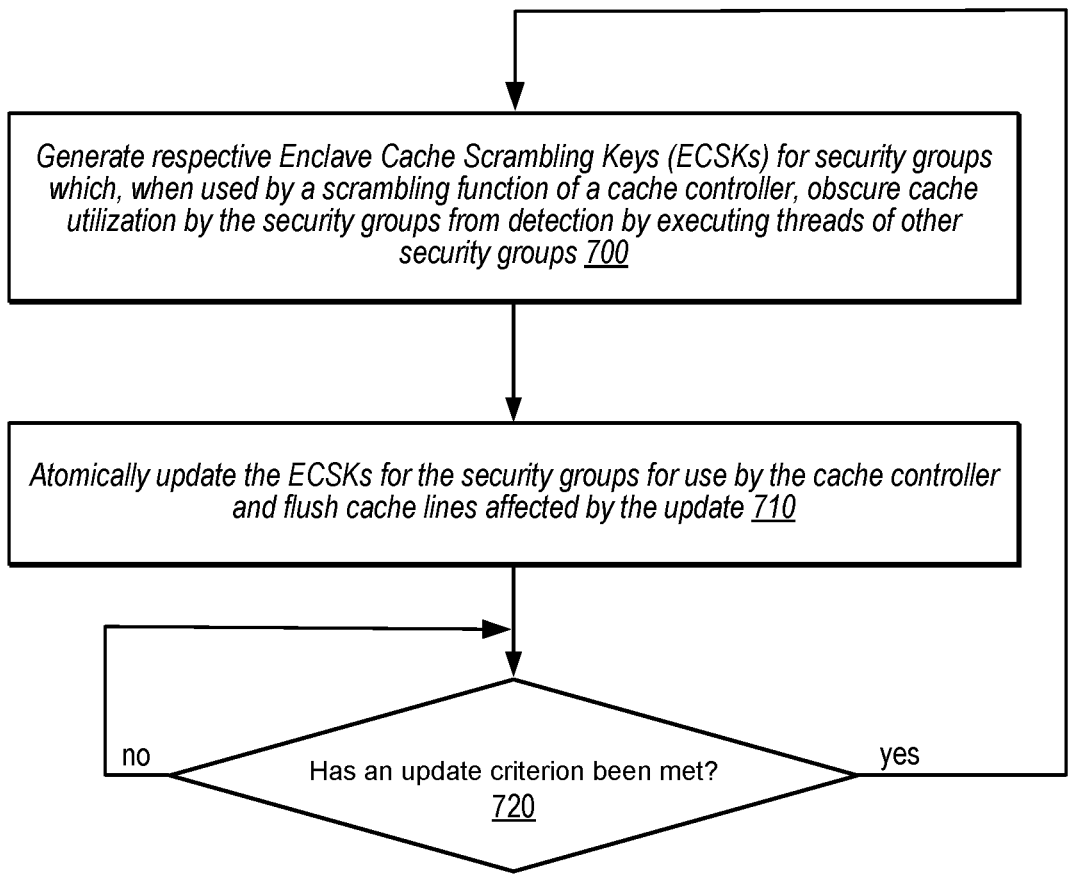
FIG. 7 is another flowchart diagram illustrating a process of updating security keys for a cache implementing hardware-assisted obscuring of cache access patterns, according to some embodiments.

FIG. 7 is flowchart diagram illustrating a process of updating security keys for a cache implementing hardware-assisted obscuring of cache access patterns, according to some embodiments. The process begins at step 700 where respective Enclave Cache Security Key (ECSKs) are generated for different security groups, or enclaves.

In some embodiments, ECSKs may be derived from or directly coupled to enclave encryption keys in systems that provide support for encrypted memory. In this way, hardware-assisted obscuring of cache access patterns may be implemented in combination with hardware encryption of memory. In some embodiments, the ECSK may be generated such that, when used by a scrambler of a cache, such as the scrambler 440 of FIG. 4, candidate sets of cache lines will be selected from the particular partition reserved. An ECSK generated for a particular enclave, when used by a scrambler of a cache, may result in a mapping of a memory address to a set of candidate cache locations that is different from respective mappings generated for ECSKs generated for other enclaves, in some embodiments.

Once ECSKs have been generated, as shown in 710, the ECSKs for the security groups may be updated in the cache controller. Updates to the ECSKs may be require, in some embodiments, atomic flushing of all or portions of cache memory affected by the updated ECSKs to ensure data integrity.

As shown in 720, the process may wait until an update criterion has been met, for example a period of time has elapsed, before the process returns to 700 to update ECSKs again. In some embodiments, the period of time may be predetermined and updates may occur on a fixed schedule, while in other embodiments the time period may be variable or updates may be performed based on other update criteria such as a determination made in accordance with various performance metrics, such as cache performance metrics, or responsive to various system events such as a change in the number of configuration of security groups. ECSKs may be updated for any number of reasons in various embodiments and updating ECSK on fixed or variable time periods is not intended to be limiting.

Additionally, in some embodiments using multiple, different scramblers in a multi-level cache hierarchy, different cache levels may receive ECSK updates at different time intervals optimized to the particular architecture as well as performance and security requirements of each cache level. For example, a smaller, lower latency cache, such as the L1 caches 142 and 144 of FIG. 1, may implement a simple scrambling function that benefits from a frequent ECSK update interval while suffering less performance cost from more frequent cache flushes due to the smaller size of the cache while a larger, higher latency cache, such as the LLC cache 134 of FIG. 1, may choose a more complex scrambling function with a slower ECSK update interval to reduce the performance impact of cache flushes on the relatively larger cache size. Furthermore, ECSK update intervals may be updated by the system responsive to evolving security threats or performance metrics obtained during system execution.

The methods described herein may in various embodiments be implemented by any combination of hardware and software. For example, in some embodiments, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various items may be added, reordered, combined, omitted, modified, etc.

Figure 8:
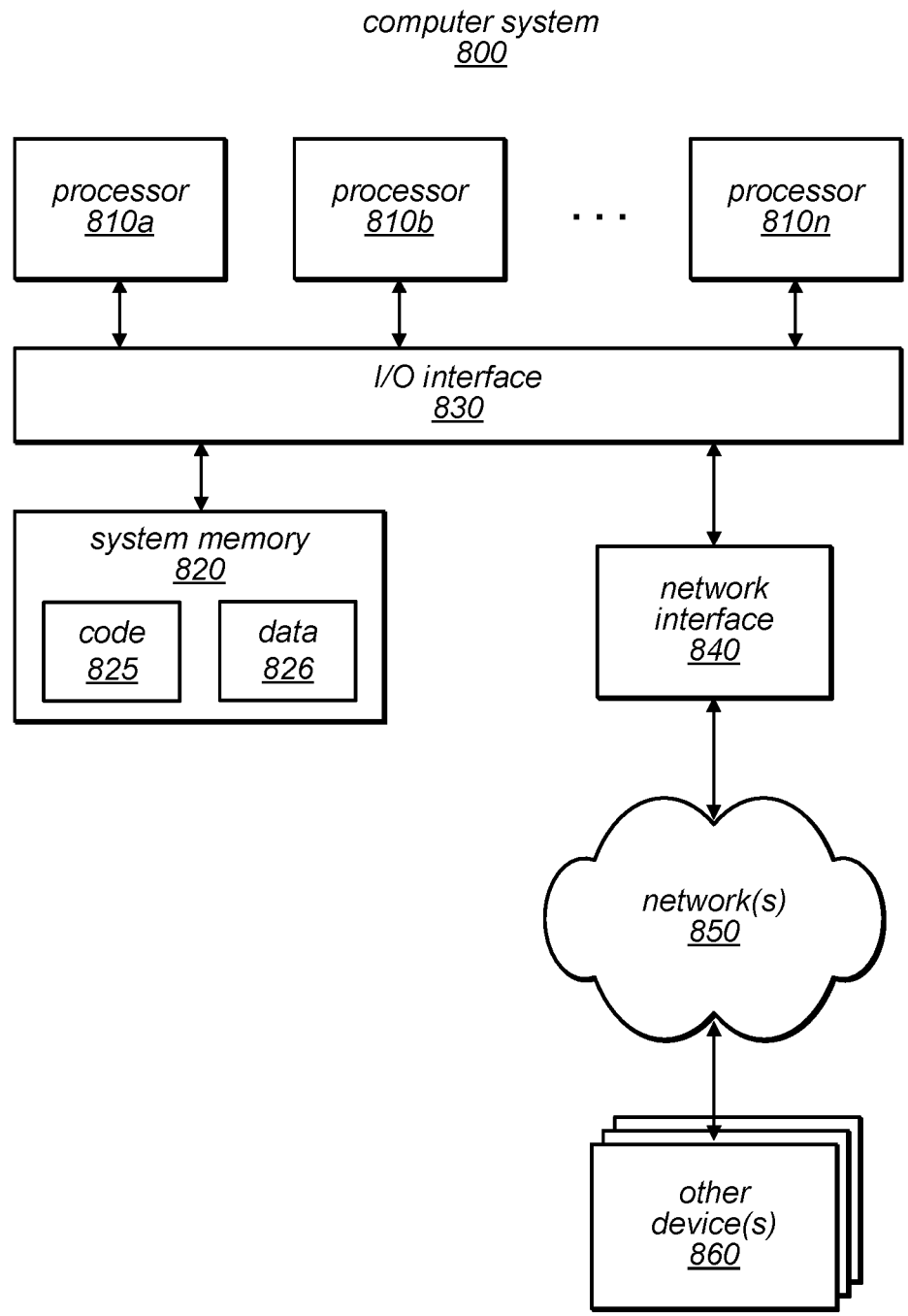
FIG. 8 is a block diagram illustrating an example computer system that mitigates side-channel attacks using a shared cache, according to some embodiments.

FIG. 8 is a block diagram illustrating an example computer system that mitigates side-channel attacks using a shared cache, according to some embodiments. Computer system 800 may include or be configured to access one or more nonvolatile computer-accessible media. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 826. The system memory 820 may include different levels of cache, some of which may be located on the processor and some away from the processor. One level of the cache hierarchy may be a last level cache that is shared by all of the processors 810*a* to 810*n*. The last level cache may be an inclusive cache of the low levels of cache in the cache hierarchy.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices, such as routers and other computing devices. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium, such as a network and/or a wireless link, such as may be implemented via network interface 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Those skilled in the art will appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

The various methods as illustrated in the Figures and described herein represent example embodiments of methods. The methods may be implemented in software, hardware, or a combination thereof. The order of method may be changed, and various items may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a hardware processor and memory;
a cache controller configured to utilize a plurality of security keys, comprising a first security key and a second security key different from the first security key, to perform respective memory accesses, including a first access and a second access, for respective ones of a plurality of different threads comprising a first thread of execution and a second thread of execution, wherein the first thread of execution is a member of a first security group, wherein the second thread of execution is a member of a second security group, and wherein to utilize the plurality of security keys the cache controller is configured to:
receive a first access to an address of the memory from the first thread of execution executing on the hardware processor and associated with the first security group, and responsive to the receiving the first access:
identify the first security key according to an identifier of the first security group;
scramble a portion of the address of the memory according to the selected first security key using a first scrambling function to generate a first index; and
identify a first set of candidate cache locations mapping to the address of the memory using the generated first index; and
receive second access to another address of the memory from the second thread of execution executing on the hardware processor and associated with the second security group, and responsive to the receiving the second access:
identify the second security key according to an identifier of the second security group;
scramble the portion of the other address of the memory according to the selected second security key using the first scrambling function to generate a second index; and
identify a second set of candidate cache locations mapping to the address of the memory using the generated second index, wherein the second security key differs from the first security key, wherein the second index differs from the first index according to a difference between the second security key and the first security key, and wherein the second set of candidate cache locations differs from the first set of candidate cache locations.

2. The system of claim 1, the cache controller further configured to:
receive an access to the address of the memory from the first thread of execution associated with a third security key;
scramble the portion of the address of the memory according to the third security key using a second scrambling function to generate a third index;
identify a third set of candidate cache locations mapping to the address of the memory using the generated third index, wherein the first and second set of candidate cache locations are of a first cache tier different from a second cache tier, and wherein the second scrambling function is different from the first scrambling function.

3. The system of claim 2, the cache controller further configured to:
change the first and second security keys of the first scrambling function according to a first time interval;
change the third security key of the second scrambling function according to a second time interval different from the first time interval, wherein first and second scrambling functions use different respective security keys based at least in part on respective identifiers of the respective security groups.

4. The system of claim 1, the cache controller further configured to:
determine one of a plurality of cache partitions using the first scrambling function.

5. A method, comprising:
utilizing a plurality of security keys, comprising a first security key and a second security key, to perform respective memory accesses for respective ones of a plurality of security groups comprising a first security group and a second security group, the utilizing of the plurality of security keys comprising:
identifying a first set of candidate cache locations mapping to a memory address according to the first security key of the first security group, the memory address accessed by a first thread of execution of a processor as a member of the first security group and the first security key identified according to an identifier of the first security group, wherein the identifying comprises scrambling a portion of the memory address according to the selected first security key using a first scrambling function to generate a first index; and
identifying a second set of candidate cache locations mapping to another memory address according to the second security key of the second security group, the other memory address accessed by a second thread of execution of a processor as a member of the second security group and the second security key identified according to an identifier of the second security group, wherein the identifying comprises scrambling a portion of the other memory address according to the second security key using the first scrambling function to generate a second index, wherein the second security group differs from the first security group, wherein the second security key differs from the first security key, wherein the second thread of execution differs from the first thread of execution, and wherein the second set of candidate cache locations differs from the first set of candidate cache locations according to a difference between the second security key and the first security key.

6. The method of claim 5,
wherein identifying the first set of candidate cache locations mapping to the memory address comprises determining a first index using a first scrambling function that alters a portion of the memory address according to the first security key selected at least in part on an identifier of the first security group; and
wherein identifying the second set of candidate cache locations mapping to the memory address comprises determining a second index using the first scrambling function that alters the portion of the memory address according to the second security key selected at least in part on an identifier of the second security group.

7. The method of claim 6, further comprising:
determining a cache performance metric for a cache comprising the first and second set of candidate cache locations; and
changing the respective security keys of the first scrambling function according to a determined cache performance metric.

8. The method of claim 6, further comprising:
changing the respective security keys of the first scrambling function according to a first time interval.

9. The method of claim 6, further comprising:
determining a third set of candidate cache locations of a second cache tier mapping to the memory address according to the first security group using a second scrambling function, wherein the first and second set of candidate cache locations are of a first cache tier different than the second cache tier, and wherein the second scrambling function is different from the first scrambling function.

10. The method of claim 9, further comprising:
changing the respective security keys of the second scrambling function according to a second time interval different from the first time interval, wherein first and second scrambling functions use different respective security keys based at least in part on respective identifiers of the respective security groups.

11. The method of claim 6, the identifying the respective sets of candidate locations further comprising:
determining a cache partition of a plurality of cache partitions according to the first security key, wherein the cache partition comprises the first set of candidate cache locations.

12. The method of claim 5, wherein the memory address is a virtual address.

13. The method of claim 5, wherein the memory address is a physical address.

14. A cache controller interfacing one or more processors to memory, the cache controller configured to:
utilize a plurality of security keys, comprising a first security key and a second security key, to perform respective memory accesses for respective ones of a plurality of security groups comprising a first security group and a second security group, wherein to utilize the plurality of security keys the cache controller is configured to:
identify a first set of candidate cache locations mapping to a memory address according to the first security key of the first security group, the memory address accessed by a first thread of execution of a processor as a member of the first security group and the first security key identified according to an identifier of the first security group, wherein to identify the first set of candidate cache locations the cache controller is configured to scramble a portion of the memory address according to the selected first security key using a first scrambling function to generate a first index; and
identify a second set of candidate cache locations mapping to another memory address according to the second security key of the second security group, the other memory address accessed by a second thread of execution of a processor as a member of the second security group and the second security key identified according to an identifier of the second security group, wherein to identify the second set of candidate cache locations the cache controller is configured to scramble a portion of the other memory address according to the second security key using the first scrambling function to generate a second index, wherein the second security group differs from the first security group, wherein the second security key differs from the first security key, wherein the second thread of execution differs from the first thread of execution, and wherein the second set of candidate cache locations differs from the first set of candidate cache locations according to a difference between the second security key and the first security key.

15. The cache controller of claim 14,
wherein to identify the first set of candidate cache locations, the cache controller is configured to determine a first index using a first scrambling function that alters a portion of the memory address according to the first security key; and
wherein to identify the second set of candidate cache locations, the cache controller is configured to determine a second index using the first scrambling function that alters the portion of the memory address according to the second security key.

16. The cache controller of claim 15, further configured change the respective security keys of the first scrambling function responsive to a change in number of the plurality of security groups.

17. The cache controller of claim 15, further configured to:
change the respective security keys of the first scrambling function according to a first time interval.

18. The cache controller of claim 15, further configured to:
identify a third set of candidate cache locations of a second cache tier mapping to the memory address according to a third security key of the first security group using a second scrambling function, wherein the first and second set of candidate cache locations are of a first cache tier different than the second cache tier, and wherein the second scrambling function is different from the first scrambling function.

19. The cache controller of claim 18, further configured to:
change the respective security keys of the second scrambling function according to a second time interval different from the first time interval, wherein first and second scrambling functions use different respective security keys based at least in part on respective identifiers of the respective security groups.

20. The cache controller of claim 14, further configured to:
determine a cache partition of a plurality of cache partitions according to the first security key, wherein the cache partition comprises the first set of candidate cache locations.

* * * * *